(12) United States Patent
Fendell

(10) Patent No.: US 11,209,573 B2
(45) Date of Patent: Dec. 28, 2021

(54) RADIO OCCULTATION AIRCRAFT NAVIGATION AID SYSTEM

(71) Applicant: Francis E. Fendell, Los Angeles, CA (US)

(72) Inventor: Francis E. Fendell, Los Angeles, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 14 days.

(21) Appl. No.: 16/736,559

(22) Filed: Jan. 7, 2020

(65) Prior Publication Data

US 2021/0208306 A1    Jul. 8, 2021

(51) Int. Cl.
*G01W 1/00* (2006.01)
*G01S 19/14* (2010.01)
*G01S 19/49* (2010.01)

(52) U.S. Cl.
CPC ............... *G01W 1/00* (2013.01); *G01S 19/14* (2013.01); *G01S 19/49* (2013.01)

(58) Field of Classification Search
CPC ........... G01W 1/00; G01W 1/02; G01W 1/04; G01W 1/06; G01W 1/08; G01W 2001/003; G08G 5/0091; G01S 19/49; G01S 19/14; G01S 13/953
USPC ......................................... 342/357.32, 26 B
See application file for complete search history.

(56) References Cited

U.S. PATENT DOCUMENTS

| | | | |
|---|---|---|---|
| 1,779,855 A | 10/1930 | Roche | |
| 2,399,217 A | 3/1942 | Fahrney | |
| 2,385,392 A | 9/1945 | Van Dusen | |
| 2,612,327 A | 9/1952 | Carlson | |
| 2,843,337 A | 7/1958 | Bennett | |
| 3,113,747 A | 12/1963 | Smith | |

(Continued)

FOREIGN PATENT DOCUMENTS

WO    2006083361 A2    8/2006

OTHER PUBLICATIONS

Bongshin Lee, et al., "Beyond mouse and keyboard: Expanding design considerations for information visualization interactions." Visualization and Computer Graphics. IEEE Transactions on 18.12 (2012): 2689-2698.

(Continued)

*Primary Examiner* — Erin F Heard
*Assistant Examiner* — Michael W Justice
(74) *Attorney, Agent, or Firm* — Tarolli, Sundheim, Covell & Tummino LLP

(57) ABSTRACT

One example includes an aircraft navigation system associated with an aircraft. The system includes a radio receiver configured to receive a radio signal that propagates from a remote transmitter through a portion of atmosphere to the aircraft. The system also includes an occultation processor configured to process the radio signal to determine a hazardous characteristic of the portion of the atmosphere through which the radio signal propagates. The system further includes an inertial navigation system (INS) configured to detect an intended flight path through the portion of the atmosphere and to provide a warning alarm in response to a determination of the intended flight path through the portion of the atmosphere comprising the determined hazardous characteristic.

17 Claims, 3 Drawing Sheets

(56) References Cited

U.S. PATENT DOCUMENTS

| | | | |
|---|---|---|---|
| 4,248,394 A | 2/1981 | Klumpp | |
| 4,267,987 A | 5/1981 | McDonnell | |
| 4,678,141 A | 7/1987 | Sarrantonio | |
| 4,757,959 A | 7/1988 | Schroder et al. | |
| 4,824,047 A | 4/1989 | Chadwick | |
| 5,000,398 A | 3/1991 | Rashev | |
| 5,188,313 A | 2/1993 | Piasecki | |
| 5,675,081 A * | 10/1997 | Solheim | G01S 19/14 324/640 |
| 6,067,852 A * | 5/2000 | Alber | G01S 19/07 73/178 R |
| 6,377,207 B1 * | 4/2002 | Solheim | G01W 1/02 324/640 |
| 6,691,949 B2 | 2/2004 | Plump et al. | |
| 7,137,126 B1 | 11/2006 | Coffman et al. | |
| 7,357,352 B2 | 4/2008 | Speer et al. | |
| 7,598,901 B2 * | 10/2009 | Tillotson | G01P 5/001 342/26 B |
| 7,728,759 B2 * | 6/2010 | Tillotson | G08G 5/0021 342/26 A |
| 7,872,603 B2 * | 1/2011 | Tillotson | G01S 13/88 342/26 B |
| 7,880,666 B2 * | 2/2011 | Tillotson | G08G 5/0091 342/26 B |
| 8,174,431 B2 * | 5/2012 | Tillotson | G01W 1/16 342/26 B |
| 8,176,438 B2 | 5/2012 | Zaman et al. | |
| 8,320,630 B2 * | 11/2012 | Tillotson | G06T 7/285 382/107 |
| 8,740,134 B2 | 6/2014 | Satoshi | |
| 8,910,228 B2 | 12/2014 | Agrawal et al. | |
| 8,910,902 B2 | 12/2014 | Speer | |
| 8,950,698 B1 | 2/2015 | Rossi | |
| 9,022,322 B2 | 5/2015 | Westbrook, Sr. | |
| 9,188,700 B2 * | 11/2015 | Bunch | G01W 1/00 |
| 9,359,075 B1 | 6/2016 | Von Flotow et al. | |
| 10,545,243 B2 * | 1/2020 | MacDonald | G01S 19/08 |
| 2006/0121893 A1 * | 6/2006 | Tillotson | G01P 5/001 455/431 |
| 2009/0189802 A1 * | 7/2009 | Tillotson | G01S 19/14 342/26 B |
| 2009/0267826 A1 * | 10/2009 | Tillotson | G01P 5/001 342/26 R |
| 2009/0284479 A1 | 11/2009 | Dennis et al. | |
| 2009/0294573 A1 | 12/2009 | Wilson et al. | |
| 2010/0052978 A1 * | 3/2010 | Tillotson | G01S 13/88 342/26 B |
| 2010/0193625 A1 | 8/2010 | Sommer | |
| 2011/0049288 A1 | 3/2011 | Suzuki | |
| 2011/0085698 A1 * | 4/2011 | Tillotson | G01W 1/00 382/103 |
| 2011/0140955 A1 * | 6/2011 | Tillotson | G01S 13/955 342/26 A |
| 2011/0157178 A1 | 6/2011 | Tuzel et al. | |
| 2012/0068863 A1 | 3/2012 | Tillotson | |
| 2012/0091259 A1 | 4/2012 | Morris et al. | |
| 2012/0232721 A1 | 9/2012 | Engblom | |
| 2013/0037650 A1 | 2/2013 | Heppe | |
| 2013/0070108 A1 | 3/2013 | Aerts et al. | |
| 2013/0202071 A1 | 8/2013 | Wei et al. | |
| 2014/0130090 A1 | 5/2014 | Krikorian | |
| 2014/0130116 A1 | 5/2014 | Krikorian | |
| 2014/0158812 A1 | 6/2014 | Luther | |
| 2015/0021428 A1 | 1/2015 | Rutan | |
| 2015/0143459 A1 | 5/2015 | Molnar et al. | |
| 2015/0353197 A1 | 12/2015 | Alber | |
| 2016/0012643 A1 | 1/2016 | Kezele et al. | |
| 2016/0147308 A1 | 5/2016 | Gelman et al. | |
| 2016/0297520 A1 | 10/2016 | Sada-Salinas et al. | |
| 2018/0249144 A1 | 8/2018 | Feng et al. | |
| 2018/0364393 A1 | 12/2018 | Platzer | |
| 2019/0146092 A1 | 5/2019 | MacDonald et al. | |

OTHER PUBLICATIONS

Wolfgang Broll, et al., "An infrastructure for realizing custom-tailored augmented reality user interfaces." Visualization and Computer Graphics, IEEE Transactions on 11.6 (2005): 722-733.

International Search Report for Application No. PCT/US2020/057728 dated Feb. 4, 2021.

* cited by examiner

RADIO OCCULTATION AIRCRAFT NAVIGATION AID SYSTEM

TECHNICAL FIELD

The present disclosure relates generally to aviation, and specifically to a radio occultation aircraft navigation system.

BACKGROUND

Since the dawn of aviation, certain weather conditions have been deemed hazardous for navigating aircraft. Obvious conditions, such as severe turbulence, thunderstorms, and others can be relatively readily detected with the aid of modern instrumentation and sensors and avoided by a pilot. However, the buildup of ice on airfoils and rotor blades persists as an aerodynamic-profile-modifying challenge. Ice buildup on aircraft can increase drag by increasing the area of the airfoil profile, can decrease the ability to generate lift by altering the airfoil camber, can add potentially significant weight, and can often engender vibration of the aircraft owing to imbalance based on ice accumulation on the structure being asymmetrical. Inflight-operative anti-icing systems to preclude ice accumulation are typically desirable, but can often require nearly prohibitive amounts of power. Deicing systems to remove already-accumulated ice can sometimes prove inadequate.

SUMMARY

One example includes an aircraft navigation system associated with an aircraft. The system includes a radio receiver configured to receive a radio signal that propagates from a remote transmitter through a portion of atmosphere to the aircraft. The system also includes an occultation processor configured to process the radio signal to determine a hazardous characteristic of the portion of the atmosphere through which the radio signal propagates. The system further includes an inertial navigation system (INS) configured to detect an intended flight path through the portion of the atmosphere and to provide a warning alarm in response to a determination of the intended flight path through the portion of the atmosphere comprising the determined hazardous characteristic.

Another example includes a method for navigating an aircraft. The method includes receiving GNSS signals that propagate from at least one GNSS satellite through a portion of atmosphere to the aircraft. The method also includes processing the GNSS signals via an occultation processor to determine a hazardous characteristic of the portion of the atmosphere through which the GNSS signals propagate. The method also includes detecting an intended flight path through the portion of the atmosphere via an INS. The method further includes determining an alternate flight path for the aircraft to avoid the portion of the atmosphere in response to the determination of the intended flight path through the portion of the atmosphere comprising the determined hazardous characteristic.

Another example includes an aircraft navigation system associated with an aircraft. The system includes a GNSS receiver configured to receive GNSS signals that propagate from at least one GNSS satellite through a portion of atmosphere to the aircraft. The system also includes an occultation processor configured to process the GNSS signals to determine an ice-formation characteristic of the portion of the atmosphere through which the GNSS signals propagate. The system further includes an INS configured to detect an intended flight path through the portion of the atmosphere and to determine an alternate flight path for the aircraft to avoid the portion of the atmosphere in response to the determination of the intended flight path through the portion of the atmosphere comprising the determined ice-formation characteristic.

DETAILED DESCRIPTION

Figure 1:
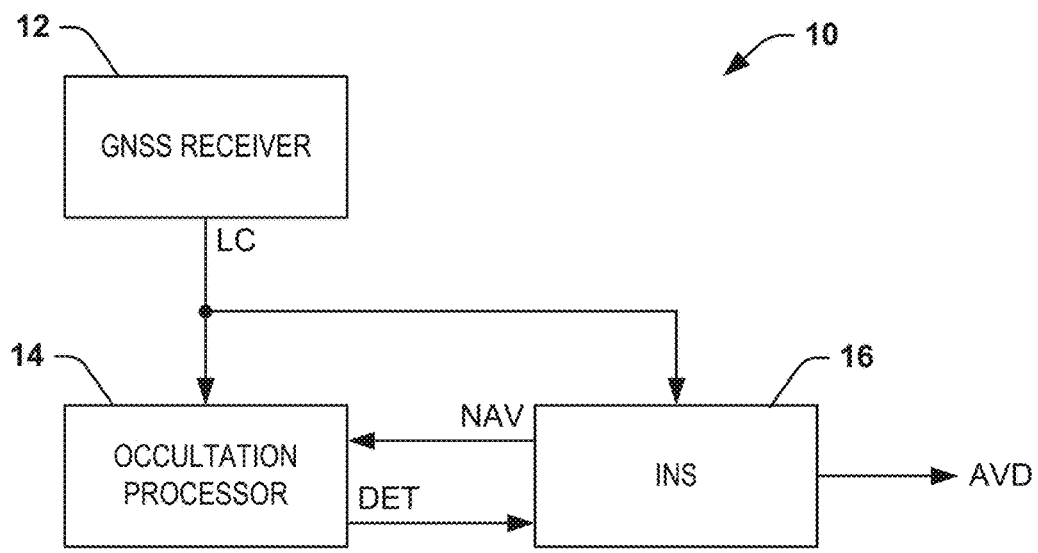
FIG. 1 illustrates an example of a radio occultation aircraft navigation system.

The present disclosure relates generally to aviation, and specifically to a radio occultation aircraft navigation system. The aircraft navigation system can be included in any of a variety of aircraft, such as a manned or unmanned (e.g., piloted or autonomous), fixed-wing or rotary aircraft. The aircraft navigation system includes a radio receiver configured to receive a radio signal from a remote transmitter through a portion of the atmosphere. As an example, the radio receiver can be a global navigation satellite system (GNSS) receiver configured to receive GNSS signals from at least one GNSS satellite. For example, the GNSS receiver can receive a successively sampled sequence of the GNSS signals from a given one of the GNSS satellites in a GNSS satellite constellation. The portion of the atmosphere can be a portion of the atmosphere that can be located, for example, at an approximate front arc of the aircraft, such that the portion of the atmosphere can correspond to a region of the atmosphere through which the aircraft can trace an intended flight path. The aircraft navigation system can also include an occultation processor that is configured to process the radio signal to determine a hazardous characteristic of the portion of the atmosphere through which the radio signal propagates. As an example, the hazardous characteristic can correspond to a characteristic for ice-formation on the aircraft (hereinafter "ice-formation characteristic").

For example, the occultation processor can be configured to implement an algorithm based on known and estimated atmospheric parameters, such as including dry-air density, relative humidity of water vapor, altitude, and temperature, in conjunction with a refractivity of the radio signal received from the remote transmitter. The refractivity can be determined based on a delay of receipt of the radio signal at the radio receiver relative to an expected receipt time resulting from refraction of the radio signal based on weather conditions in a portion of the atmosphere. For example, the occultation processor can implement a convergence algorithm configured to calculate the relative humidity of water vapor based on estimates of the pressure and temperature in conjunction with the refractivity in a range of altitudes of interest. As another example, the occultation processor can determine the ice-formation characteristic of the portion of the atmosphere through which the radio signal propagates in response to determining the relative humidity associated with the water vapor partial pressure being approximately equal to one in the range of altitudes of interest. As described herein, the term "range of altitudes of interest" can refer to a range of altitudes in which the potentially hazardous condition can occur. For example, the range of altitudes of interest can correspond to a range of altitudes in which water vapor densities can result in the ice-formation characteristic.

The aircraft navigation system also includes an inertial navigation system (INS) that includes a set of sensors that assist with navigation of the aircraft (e.g., altimeter, gyroscope(s), magnetometer(s), and/or other navigation aids). Therefore, the INS can provide some information to the occultation processor for determination of a hazard condition of a portion of the atmosphere (e.g., over a range of altitudes). Additionally, the INS can be configured to provide an alarm in response to a determination of the hazard condition in the portion of the atmosphere through which the aircraft has a potential intended flight path, as determined by the INS. For example, the alarm can be an audial and/or visual alarm to alert a pilot to the potential danger of maintaining the intended flight path of the aircraft through the portion of the atmosphere. As another example, the INS can be configured to determine an alternate flight path to avoid the hazard condition of the portion of the atmosphere. As a result, the aircraft can avoid the hazard condition, such as ice-forming on the exterior of the aircraft, to mitigate a potential crash of the aircraft.

Figure 2:
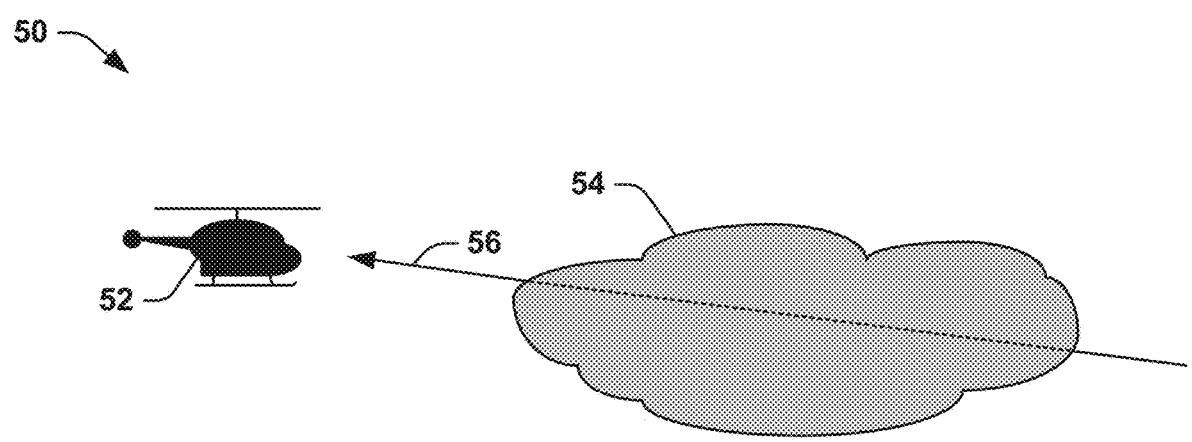
FIG. 2 illustrates an example diagram of an aircraft.

FIG. 1 illustrates an example of a radio occultation aircraft navigation system 10. The aircraft navigation system 10 can be implemented in any of a variety of aircraft, such as unmanned (e.g., piloted or autonomous), fixed-wing or rotary aircraft. As described herein, the aircraft navigation system 10 can be implemented to avoid weather-related conditions potentially hazardous to the associated aircraft. The description of the example of FIG. 1 is provided in the context of the example of FIG. 2. FIG. 2 illustrates an example diagram 50 of an aircraft 52. The aircraft 52 is demonstrated as flying toward a portion of the atmosphere 54, demonstrated in the example of FIG. 2 as a cloud.

The aircraft navigation system 10 includes a radio receiver 12 configured to receive a radio signal from a remote transmitter through a portion of the atmosphere 54. In the example of FIG. 1, the radio receiver is demonstrated as a global navigation satellite system (GNSS) receiver configured to receive GNSS signals, demonstrated collectively in the example of FIG. 2 at 56, from at least one GNSS satellite. For example, the radio receiver 12 can receive a successively sampled sequence of the GNSS signals from a given one of the GNSS satellites in a GNSS satellite constellation. For example, the GNSS system can be configured as a global positioning satellite (GPS) location system that implements L-band communication signals transmitted from a plurality of GPS satellites. The GNSS signals can typically be implemented by the radio receiver 12 for determining a location of the aircraft 52 and/or a current time. However, the radio receiver 12 can be further configured to implement the GNSS signals for occultation purposes, as described in greater detail herein. The portion of the atmosphere 54 can be a portion of the atmosphere 54 that can be located, for example, in proximity to an approximate front arc of the associated aircraft 52, such that the portion of the atmosphere 54 can correspond to a region of the atmosphere through which the aircraft 52 can trace an intended flight path. In the example of FIG. 2, the GNSS signals 56 can experience refraction based on the conditions of the portion of the atmosphere 54 (e.g., as demonstrated by the dotted lines).

In the example of FIG. 1, the GNSS receiver 12 is demonstrated as providing GNSS signals LC, corresponding to the GNSS signals 56 in the example of FIG. 2, to an occultation processor 14. The occultation processor 14 is configured to process the GNSS signals LC to determine a hazardous characteristic of the portion of the atmosphere 54 through which the GNSS signals 56 propagate. As an example, the hazardous characteristic can correspond to an aircraft 52 ice-forming characteristic. Ice buildup on an aircraft 52 can increase drag by increasing the area of the airfoil profile, can decreases the ability to generate lift by altering the airfoil camber, can add potentially significant weight, and can often engender vibration of the aircraft 52 owing to imbalance based on ice accumulation on the structure being asymmetrical. Such conditions can be severely detrimental to the aircraft 52, and can result in a crash of the aircraft 52. Therefore, detection of the hazardous characteristic of the portion of the atmosphere 54 can, as described in greater detail herein, allow for the hazardous characteristic to be avoided by the aircraft 52.

For example, the occultation processor 14 can be configured to implement an algorithm based on known and estimated atmospheric parameters, such as including pressure, relative humidity of water vapor, altitude, and temperature, in conjunction with a refractivity of the GNSS signals 56 received from the respective GNSS satellite(s). The refractivity can be determined based on a delay of receipt of the GNSS signals 56 at the GNSS receiver 10 relative to an expected receipt time resulting from refraction of the GNSS signals 56 based on weather conditions in the portion of the atmosphere 54. For example, the occultation processor 14 can implement a convergence algorithm configured to calculate the relative humidity of water vapor based on estimates of pressure and temperature in conjunction with refractivity in a range of altitudes of interest. As another example, the occultation processor 14 can determine the aircraft 52 ice-forming characteristic of the portion of the atmosphere 54 through which the GNSS signals 56 propagate as a consequence of determining the relative humidity associated with the presence of water vapor being approximately equal to one in the range of altitudes of interest.

The aircraft navigation system 10 also includes an inertial navigation system (INS) 16. The INS 16 can include a set of sensors that assist with navigation of the aircraft 52, such as including an altimeter, one or more gyroscopes, one or more magnetometers, and/or any of a variety of other navigation aids. For example, the INS 16 can also track a projected flight path of the aircraft 52. In the example of FIG. 1, the INS 16 is demonstrated as providing navigation information, demonstrated as a signal NAV, to the occultation processor 14 for determination of the hazard condition of the portion of the atmosphere 54. As an example, the information in the signal NAV can include altitude, temperature, and/or other navigation information. While the example of FIG. 1, demonstrates that the GNSS receiver 12, the occultation processor 14, and the INS 16 are separate components, it is to be understood that the INS 16 can include the GNSS receiver 12 and/or the occultation processor 14. For example, the occultation processor 14 can be configured as a processor, a field programmable gate array (FPGA), an application specific integrated circuit (ASIC), or other processing device, or as a portion of any such processing device, in the INS 16.

In the example of FIG. 1, the occultation processor 14 provides a signal DET corresponding to a determination of the hazardous condition. Therefore, in response to receiving the signal DET that is indicative of the detection of the hazardous condition, the INS 16 can be configured to provide an alarm based on the hazard condition associated with the portion of the atmosphere 54 through which the aircraft 52 has a potential intended flight path, as determined by the INS 16. For example, the alarm can be an audial and/or visual alarm to alert a pilot to the potential danger of maintaining the intended flight path of the aircraft 52 through the portion of the atmosphere 54. As another example, the alarm can trigger an obstacle avoidance algorithm associated with an autonomous vehicle control system. As another example, the INS 16 can be configured to determine an alternate flight path (e.g. for a pilot or for an autonomous vehicle control system) to avoid the hazard condition of the portion of the atmosphere 54. As a result, the aircraft 52 can avoid the hazard condition, such as ice-forming on the exterior of the aircraft 52, to mitigate a potential crash of the aircraft 52.

Figure 3:
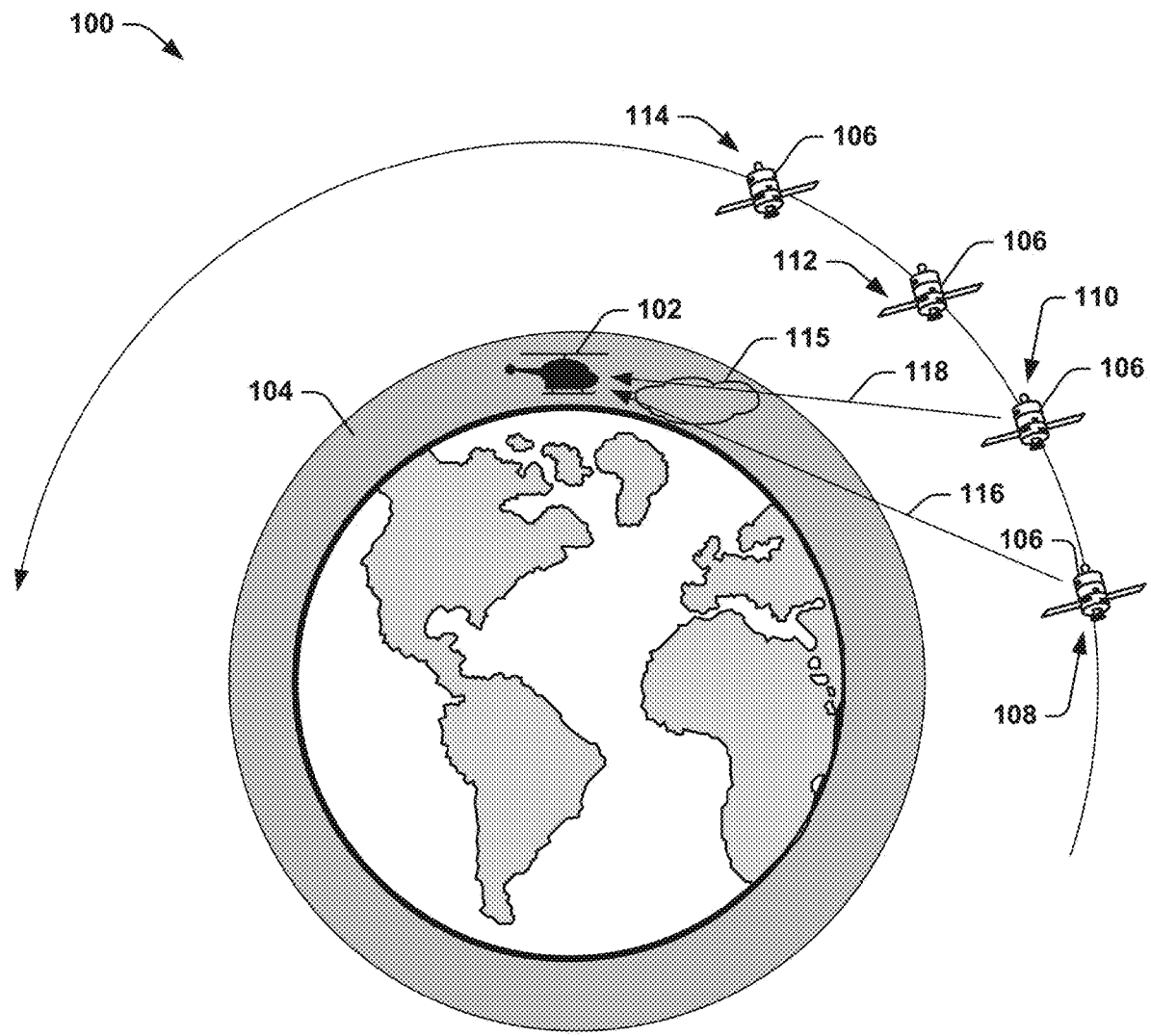
FIG. 3 illustrates an example diagram of airborne occultation.

FIG. 3 illustrates an example diagram 100 of airborne occultation. The diagram 100 can correspond to radio occultation described herein to determine the presence of a weather-based hazard condition, such as an ice-formation characteristic of a portion of the atmosphere. Therefore, reference is to be made to the example of FIGS. 1 and 2 in the following description of the example of FIG. 3.

The diagram 100 demonstrates an exaggerated view of an aircraft 102 flying in the atmosphere, demonstrated at 104, about Earth. As an example, the aircraft 102 can include the aircraft navigation system 10. Therefore, the aircraft 102 can be provided a warning from the aircraft navigation system 10 of a hazardous characteristic of a portion of the atmosphere 104 through which the aircraft 102 has an imminent flight path. In the example of FIG. 3, the diagram 100 also includes a satellite 106, demonstrated as ascending in the horizon in a first position 108, a second position 110, a third position 112, and a fourth position 114 with respect to the aircraft 102 as the satellite 106 orbits Earth. As an example, the satellite 106 can correspond to a GNSS satellite that is part of a GNSS satellite constellation that provides GNSS signals to the aircraft 102. As described herein, the GNSS signals can be implemented for radio occultation to determine the presence of a weather-based hazard condition, such as an ice-formation characteristic of a portion of the atmosphere 104, the portion of the atmosphere being demonstrated generally at 115.

In the example of FIG. 3, the satellite 106 is demonstrated as providing respective GNSS signals 116 and 118 to the aircraft 102 at each of the respective first and second positions 108 and 110, thus demonstrating that the radio receiver 12 of the aircraft 102 can successively sample the GNSS signals 116 and 118 from the satellite 106. It is to be understood that the satellite 106 is not limited to transmitting GNSS signals exemplified by 116 and 118 at two locations, but that the satellite 106 can substantially continuously transmit the GNSS signals. As described herein, the radio occultation can be implemented based on a refractivity of the GNSS signals based on a refraction of the GNSS signals 116 and 118 through the atmosphere 104 at angles from the GNSS satellites that are below the GNSS receiver 12 of the aircraft navigation system 10, as demonstrated with respect to the satellite 106 in the first and second positions 108 and 110. While the example of FIG. 3 demonstrates a single satellite 106 providing GNSS signals, the radio occultation process can include additional satellites that can subsequently be positioned approximately for providing GNSS signals to the aircraft 102. For example, a new satellite in the GNSS satellite constellation can become available for the radio occultation once every approximately twenty minutes.

For example, the satellite 106 can emit GNSS signals at a frequency in the L-band range of frequencies (e.g., approximately 1.2 GHz or approximately 1.6 GHz). Suspended or precipitating hydrometeors can have only a small effect on the refraction of the GNSS signals 116 and 118. As a result, the GNSS signals can implement all-weather real-time monitoring of the atmosphere 104, from which profiles of the temperature, pressure, and water vapor pressure can be derived. For example, the GNSS signals can be implemented to provide radio occultation with respect to the GNSS receiver 12 of the aircraft navigation system 10 to determine a potential icing hazard with respect to low-altitude clouds with super-cooled water droplets. As an example, such low-altitude cloudy regions with super-cooled water droplets can be characterized by altitude below approximately 16 km, relative humidity approaching approximately 100%, and at temperatures between approximately 0° C. and approximately −20° C.

As described previously, the radio occultation can be implemented based on a refractivity of the GNSS signals. For example, refractivity N associated with the GNSS signals 116 and 118, inter alia, such as obtained from the measured ray-bending angle by a classical-optics formula, is known to be related to geophysical quantities in the troposphere, as expressed by:

$$N \approx a_1 \frac{p}{T} + a_2 \frac{p_w}{T^2}, \quad (1)$$

Wherein: p denotes total pressure;
T denotes temperature;
$p_w$ denotes water vapor partial pressure;
$a_1$=77.6 K/hPa; and
$a_2$=3.73×10$^5$ K$^2$/hPa.

For hydrostatic equilibrium, the troposphere can be described by:

$$\frac{dp}{dh} = -\rho g. \quad (2)$$

Under the ideal gas law, the total density ρ can be expressed as:

$$\rho = \rho_d + \rho_w \approx \frac{m_d p}{\mathcal{R}T} + \frac{(m_w - m_d)p_w}{\mathcal{R}T}, \quad (3)$$

Wherein: h denotes altitude;
g denotes gravitational acceleration;
ρ denotes total gas density;
$\rho_d$ denotes dry-air density;
$\rho_w$ denotes water-vapor density;
$m_d$ denotes molecular weight of dry air (29 kg/kmol);
$m_w$ denotes molecular weight of water vapor (18 kg/kmol); and
R denotes universal gas constant (8314 J/kmol-K).

From Equations (2) and (3), using Equation (1) to substitute for (p/T), the following expression is obtained:

$$\frac{dp}{dh} = -\frac{gm_d}{a_1 \mathcal{R}} N + \frac{a_2 g m_d}{a_1 \mathcal{R}} \frac{p_w}{T^2} + \frac{g(m_d - m_w)}{\mathcal{R}} \frac{p_w}{T}. \quad (4)$$

Equations (1) and (4) therefore constitute two relationships linking the three dependent variables of temperature T(h), total gas pressure p(h), and water-vapor partial pressure $p_w$(h), with refractivity N(h) as an input.

As an example, Equations (1) and (4) may be regarded as a linear first-order differential/algebraic set of equations for the total gas pressure p(h) and the water-vapor pressure $p_w(h)$, provided an external source furnishes an approximate input for the temperature T(h). For example, if the temperature T(h) is greater than or equal to approximately 273 K, the occultation processor 14 need not implement the algorithm based on the temperature being inappropriate to provide conditions suitable for forming aircraft ice. However, if the temperature T(h) is less than or equal to approximately 273 K, the occultation processor 14 can implement an iterative convergence algorithm to determine the water-vapor pressure $p_w(h)$. For example, the occultation processor 14 can initiate the algorithm by setting the water-vapor pressure $p_w(h)=0$ as an initial value, and can obtain the total gas pressure p(h) from Equation (4), such as with an initial value of the total gas pressure $p(h_1)=p_1$ as a prescribed boundary condition. The occultation processor 14 can then obtain an update for the water-vapor partial pressure $p_w(h)$ from Equation (1), using estimates of the total gas pressure p(h) and temperature T(h), and can implement Equation (4) to update the total pressure p(h). The occultation processor 14 can thus iteratively repeat the steps to provide a convergence to the water-vapor partial pressure $p_w(h)$.

In response to the occultation processor 14 determining that the relative humidity associated with the presence of water vapor approaches approximately one (e.g., $p_w(h)/p_w^{sat}[T(h)] \rightarrow 1$) for a range of altitudes h of interest, then the occultation processor 14 can identify the presence of an icing hazard, where $p_w^{sat}[T]$ is the empirically known saturation water vapor pressure over water. Characterization of the error in inferred refractivity that is incurred via use of GNSS-based radio occultation with a low-Earth orbit receiver can be approximately 6% for low-altitude scenarios with large moisture content. Characterization of the vertical resolution of radio occultation profiles in the lower troposphere can be approximately 500 meters with simplistic methods. However, the distance can be reduced by half or more with the introduction of more meticulous treatment by the occultation processor 14.

Accordingly, the aircraft navigation system 10 can be implemented as described herein to provide a simple and effective manner for substantially mitigating hazardous conditions of weather, such as aircraft ice-forming conditions, with respect to an aircraft. By providing a system to implement avoidance of the weather conditions, dangers to aircraft that can result in a catastrophic crash can be substantially mitigated. The systems and methods described herein can therefore provide a better alternative to mitigating dangerous conditions to aircraft than typical systems that seek to remove ice that has already formed on the aircraft (e.g., ice-removal systems and the like). Accordingly, by substantially mitigating the chances of flying through such hazardous weather conditions, the systems and methods described herein can provide a more effective solution than existing solutions for removing already accumulated ice.

Figure 4:
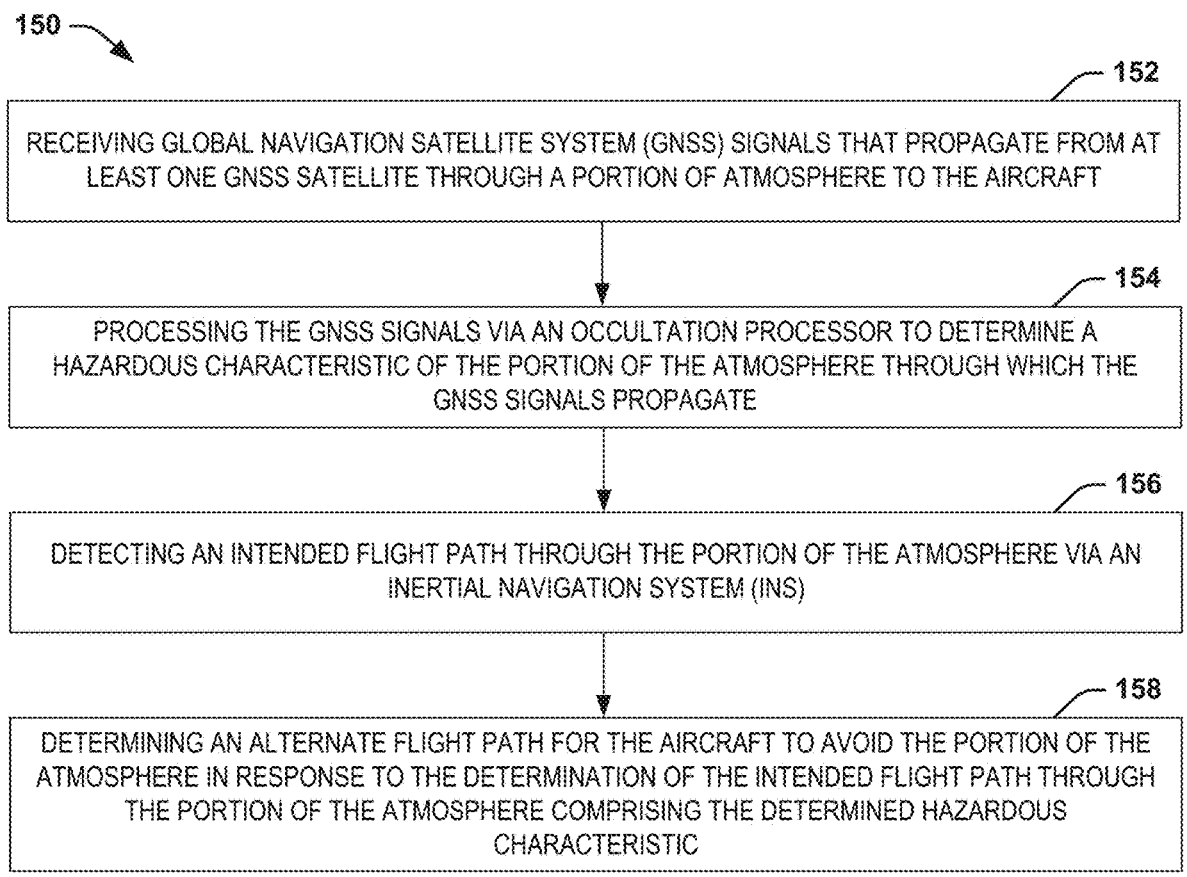
FIG. 4 illustrates an example of a method for navigating an aircraft.

In view of the foregoing structural and functional features described above, an example method will be better appreciated with reference to FIG. 4. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIG. 4 illustrates an example of a method 150 for navigating an aircraft (e.g., the aircraft 52). At 152, GNSS signals (e.g., the GNSS signals 56) that propagate from at least one GNSS satellite (e.g., the satellite 106) are received through a portion of atmosphere (e.g., the portion of the atmosphere 54) to the aircraft. At 154, the GNSS signals are processed via an occultation processor (e.g., the occultation processor 14) to determine a hazardous characteristic of the portion of the atmosphere through which the GNSS signals propagate. At 156, an intended flight path through the portion of the atmosphere is detected via an INS (e.g., the INS 16). At 158, an alternate flight path for the aircraft is determined to avoid the portion of the atmosphere in response to the determination of the intended flight path through the portion of the atmosphere comprising the determined hazardous characteristic.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An aircraft navigation system associated with an aircraft, the aircraft navigation system comprising:
   a radio receiver configured to receive a radio signal that propagates from a remote transmitter through a portion of atmosphere to the aircraft;
   an occultation processor configured to process the radio signal to determine a hazardous characteristic of the portion of the atmosphere through which the radio signal propagates, the occultation processor further configured to implement a convergence algorithm configured to calculate water vapor partial pressure based on estimates of pressure, temperature, and refractivity of the portion of the atmosphere in a range of altitudes of interest;
   an inertial navigation system (INS) configured to detect a predicted flight path; and
   a navigational aid to determine whether the predicted flight path extends through the portion of the atmosphere having the hazardous characteristic and to provide a warning alarm in response to a determination of the predicted flight path through the portion of the atmosphere comprising the determined hazardous characteristic.

2. The system of claim 1, wherein the radio receiver is configured as at least a portion of a global navigation satellite system (GNSS) configured to receive GNSS signals from a plurality of GNSS satellites.

3. The system of claim 1, wherein the occultation processor is configured to process the radio signal to determine an ice-formation characteristic of the portion of the atmosphere through which the radio signal propagates.

4. The system of claim 1, wherein the occultation processor is configured to determine the hazardous characteristic of the portion of the atmosphere by evaluating atmospheric parameters relative to refractivity of the radio signal.

5. The system of claim 4, wherein the refractivity of the radio signal is determined based on a delay of the radio signal from an expected arrival time of the radio signal resulting from refraction of the radio signal based on weather conditions in the portion of the atmosphere.

6. The system of claim 4, wherein the atmospheric parameters comprise a total gas pressure, the temperature, and the water vapor partial pressure of the portion of the atmosphere relative to altitude of the aircraft and the refractivity of the radio signal.

7. The system of claim 1, wherein the occultation processor is configured to determine ice-formation characteristic of the portion of the atmosphere through which the radio signal propagates in response to determining a relative humidity of water vapor being approximately equal to one in the range of altitudes of interest.

8. The system of claim 1, wherein the INS is configured to determine an alternate flight path for the aircraft to avoid the portion of the atmosphere in response to the determination of the intended flight path through the portion of the atmosphere comprising the determined hazardous characteristic.

9. An unmanned aircraft comprising the aircraft navigation system of claim 1.

10. A method for navigating an aircraft, the method comprising:
    receiving global navigation satellite system (GNSS) signals that propagate from at least one GNSS satellite through a portion of atmosphere to the aircraft;
    processing the GNSS signals via an occultation processor to determine a hazardous characteristic of the portion of the atmosphere through which the GNSS signals propagate, the GNSS signals comprises implementing a convergence algorithm configured to calculate a relative humidity of water vapor based on estimates of pressure, temperature, and refractivity of the portion of the atmosphere in a range of altitudes of interest; and
    detecting a predicted flight path through the portion of the atmosphere via an inertial navigation system (INS); and
    determining an alternate flight path for the aircraft to avoid the portion of the atmosphere in response to the determination of the predicted flight path through the portion of the atmosphere comprising the determined hazardous characteristic.

11. The method of claim 10, wherein processing the GNSS signals comprises processing the GNSS signals to determine an ice-formation characteristic of the portion of the atmosphere through which the GNSS signals propagates based on evaluating atmospheric parameters relative to refractivity of the GNSS signals.

12. The method of claim 11, wherein the atmospheric parameters comprise a total gas pressure, the temperature, and water vapor partial pressure of the portion of the atmosphere relative to altitude of the aircraft and the refractivity of the GNSS signals.

13. The method of claim 10, wherein processing the GNSS signals further comprises determining ice-formation characteristic of the portion of the atmosphere through which the GNSS signals propagate in response to determining the relative humidity of water vapor being approximately equal to one in the range of altitudes of interest.

14. An aircraft navigation system associated with an aircraft, the aircraft navigation system comprising:
    a global navigation satellite system (GNSS) receiver configured to receive GNSS signals that propagate from at least one GNSS satellite through a portion of atmosphere to the aircraft;
    an occultation processor configured to process the GNSS signals to determine an ice-formation characteristic of the portion of the atmosphere through which the GNSS signals propagate, the occultation processor further configured to determine the ice-formation characteristic of the portion of the atmosphere through which the GNSS signals propagate in response to determining a relative humidity of water vapor being approximately equal to one in the range of altitudes of interest;
    an inertial navigation system (INS) configured to detect a predicted flight path; and
    a navigational aid to determine whether the predicted flight path extends through the portion of the atmosphere having the hazardous characteristic and to determine an alternate flight path for the aircraft to avoid the portion of the atmosphere in response to the determination of the predicted flight path through the portion of the atmosphere comprising the determined ice-formation characteristic.

15. The system of claim 14, wherein the occultation processor is configured to determine the ice-formation characteristic of the portion of the atmosphere by evaluating atmospheric parameters relative to refractivity of the GNSS signals.

16. The system of claim 15, wherein the atmospheric parameters comprise a total pressure, temperature, and water vapor partial pressure of the portion of the atmosphere relative to altitude of the aircraft and the refractivity of the GNSS signals.

17. The system of claim 16, wherein the occultation processor is configured to implement a convergence algorithm configured to calculate the relative humidity of water vapor based on estimates of pressure and temperature and refractivity of the portion of the atmosphere in a range of altitudes of interest.

* * * * *